(12) United States Patent
Tsuduki

(10) Patent No.: US 11,885,719 B2
(45) Date of Patent: Jan. 30, 2024

(54) MEASUREMENT DATA RECORDING APPARATUS, GENERATING APPARATUS, SYSTEM, APPARATUS, METHOD, AND COMPUTER READABLE MEDIUM

(71) Applicant: Yokogawa Electric Corporation, Tokyo (JP)

(72) Inventor: Jun Tsuduki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 32 days.

(21) Appl. No.: 17/679,044

(22) Filed: Feb. 23, 2022

(65) Prior Publication Data
US 2022/0276130 A1    Sep. 1, 2022

(30) Foreign Application Priority Data
Mar. 1, 2021   (JP) .................................. 2021-032089

(51) Int. Cl.
G06F 11/30    (2006.01)
G01M 99/00    (2011.01)
G06F 11/34    (2006.01)

(52) U.S. Cl.
CPC ....... *G01M 99/005* (2013.01); *G06F 11/3013* (2013.01); *G06F 11/3447* (2013.01)

(58) Field of Classification Search
CPC .................................................. G01M 99/005
See application file for complete search history.

(56) References Cited

U.S. PATENT DOCUMENTS

| | | |
|---|---|---|
| 2018/0059656 A1 | 3/2018 | Hiruta |
| 2018/0164781 A1 | 6/2018 | Kubo |
| 2019/0179297 A1* | 6/2019 | Kuroda .................. G06N 20/00 |
| 2019/0235482 A1 | 8/2019 | Subramaniyan |
| 2020/0279129 A1 | 9/2020 | Batchelor |

FOREIGN PATENT DOCUMENTS

| | | |
|---|---|---|
| EP | 3379360 A2 | 9/2018 |
| JP | H07280603 A | 10/1995 |
| JP | 2010122912 A | 6/2010 |

(Continued)

OTHER PUBLICATIONS

Extended European Search Report for counterpart European Application No. 22159185.2, issued by the European Patent Office dated Jul. 19, 2022.

(Continued)

*Primary Examiner* — Phuong Huynh

(57) ABSTRACT

Provided is a measurement data recording apparatus including: an acquisition portion configured to acquire time-series measurement data obtained by measuring a state of a target; a recording portion configured to record the acquired measurement data; a measurement data transmission portion configured to transmit the measurement data recorded in the recording portion to a generation apparatus configured to generate a determination model for determining a quality of the state of the target; a model reception portion configured to receive the determination model generated by the generation apparatus; and a determination portion configured to determine the quality of the state of the target from newly acquired measurement data using the received determination model.

16 Claims, 10 Drawing Sheets

(56) References Cited

FOREIGN PATENT DOCUMENTS

| | | | |
|---|---|---|---|
| JP | 2011008735 A | * | 1/2011 |
| JP | 2018097616 A | | 6/2018 |
| JP | 2019124596 A | | 7/2019 |
| JP | 2020046873 | * | 3/2020 |
| JP | 2020046873 A | | 3/2020 |
| JP | 2020535569 A | | 12/2020 |
| WO | 2016143118 A1 | | 9/2016 |

OTHER PUBLICATIONS

Office Action issued for counterpart Japanese Application No. 2021-032089, issued by the Japanese Patent Office dated Apr. 4, 2023 (drafted on Mar. 24, 2023).

* cited by examiner

BATCH DETERMINATION RESULT

RESULT: NG

HEALTH INDEX: -0.246

DETERMINATION TIME: 2020/12/22 10:00:00

ABNORMALITY FACTOR: GAS LEAKAGE

DETERMINATION FILE NAME: 00001_batch.csv

*FIG.6*

| BATCH DETERMINATION RESULT | HEALTH INDEX | DETERMINATION TIME | ABNORMALITY FACTOR | DETERMINATION FILE NAME |
|---|---|---|---|---|
| OK | 3.435 | 2020/12/22 10:00:00 | - | 00001_batch.csv |
| OK | 1.937 | 2020/12/23 10:00:00 | - | 00002_batch.csv |
| NG | -0.246 | 2020/12/24 10:00:00 | GAS LEAKAGE | 00003_batch.csv |
| OK | 0.583 | 2020/12/25 10:00:00 | - | 00004_batch.csv |
| NG | -1.928 | 2020/12/26 10:00:00 | TEMPERATURE ABNORMALITY | 00005_batch.csv |

*FIG.7*

MEASUREMENT DATA RECORDING APPARATUS, GENERATING APPARATUS, SYSTEM, APPARATUS, METHOD, AND COMPUTER READABLE MEDIUM

The contents of the following Japanese patent application(s) are incorporated herein by reference:
2021-032089 filed in JP on Mar. 1, 2021

BACKGROUND

1. Technical Field

The present invention relates to a measurement data recording apparatus, a generation apparatus, a system, an apparatus, a method, and a computer readable medium.

2. Related Art

Patent Document 1 and the like describe "a predicted value including at least one or more measurement values that can be measured is calculated . . . using the generated learning model".

PRIOR ART DOCUMENT

Patent Document

Patent Document 1: Japanese Patent Application Publication No. 2019-124596
Patent Document 2: Japanese Patent Application Publication No. 2011-8735
Patent Document 3: Japanese Patent Application Publication No. 7-280603

SUMMARY

In a first aspect of the present invention, a measurement data recording apparatus is provided. The measurement data recording apparatus may include an acquisition portion configured to acquire time-series measurement data obtained by measuring a state of a target. The measurement data recording apparatus may include a recording portion configured to record the acquired measurement data. The measurement data recording apparatus may include a measurement data transmission portion configured to transmit the measurement data recorded in the recording portion to a generation apparatus configured to generate a determination model for determining a quality of the state of the target. The measurement data recording apparatus may include a model reception portion configured to receive the determination model generated by the generation apparatus. The measurement data recording apparatus may include a determination portion configured to determine the quality of the state of the target from newly acquired measurement data using the received determination model.

In a second aspect of the present invention, a generation apparatus is provided. The generation apparatus may include an acquisition portion configured to acquire time-series measurement data from a measurement data recording apparatus configured to record the measurement data regarding a state of a target. The generation apparatus may include a generation portion configured to generate a determination model for determining a quality of the state of the target from the measurement data by using the acquired time-series measurement data. The generation apparatus may include a transmission portion configured to transmit the determination model to the measurement data recording apparatus.

In a third aspect of the present invention, a system is provided. The system may include a measurement data recording apparatus according to the first aspect. The system may include a generation apparatus according to the second aspect.

In a fourth aspect of the present invention, an apparatus is provided. The apparatus may include an acquisition portion configured to acquire time-series measurement data from a measurement data recording apparatus configured to record the measurement data regarding a state of a target. The apparatus may include a learning processing portion configured to generate a determination model for determining a quality of the state of the target from the measurement data by learning processing using learning data including the time-series measurement data. The apparatus may include an analysis portion configured to perform cluster analysis on a plurality of pieces of time-series measurement data measured in a case where the state of the target is not good. The apparatus may include a specification portion configured to specify a cluster into which one time-series measurement data is to be classified in response to that one time-series measurement data is input to the determination model and the state of the target is determined as not good.

In a fifth aspect of the present invention, a method is provided. The method may include acquiring time-series measurement data obtained by measuring a state of a target. The method may include recording the acquired measurement data. The method may include transmitting the measurement data recorded in the recording to a generation apparatus configured to generate a determination model for determining a quality of the state of the target. The method may include receiving the determination model generated by the generation apparatus. The method may include determining the quality of the state of the target from newly acquired measurement data using the received determination model.

In a sixth aspect of the present invention, a method is provided. The method may include acquiring time-series measurement data from a measurement data recording apparatus configured to record the measurement data regarding a state of a target. The method may include generating a determination model for determining a quality of the state of the target from the measurement data by using the acquired time-series measurement data. The method may include transmitting the determination model to the measurement data recording apparatus.

In a seventh aspect of the present invention, a method is provided. The method may include acquiring time-series measurement data from a measurement data recording apparatus configured to record the measurement data regarding a state of a target. The method may include performing processing of learning by generating a determination model for determining a quality of the state of the target from the measurement data by learning processing using learning data including the time-series measurement data. The method may include performing cluster analysis on a plurality of pieces of time-series measurement data measured in a case where the state of the target is not good. The method may include specifying a cluster into which one time-series measurement data is to be classified in response to that one time-series measurement data is input to the determination model and the state of the target is determined as not good.

In an eighth aspect of the present invention, a computer readable medium with a program recorded therein is provided. The program may cause a computer to function as an acquisition portion configured to acquire time-series measurement data obtained by measuring a state of a target. The program may cause the computer to function as a recording portion configured to record the acquired measurement data. The program may cause the computer to function as a measurement data transmission portion configured to transmit the measurement data recorded in the recording portion to a generation apparatus configured to generate a determination model for determining a quality of the state of the target. The program may cause the computer to function as a model reception portion configured to receive the determination model generated by the generation apparatus. The program may cause the computer to function as a determination portion configured to determine the quality of the state of the target from newly acquired measurement data using the received determination model.

In a ninth aspect of the present invention, a computer readable medium with a program recorded therein is provided. The program may cause a computer to function as an acquisition portion configured to acquire time-series measurement data from a measurement data recording apparatus configured to record the measurement data regarding a state of a target. The program may cause the computer to function as a generation portion configured to generate a determination model for determining a quality of the state of the target from the measurement data by using the acquired time-series measurement data. The program may cause the computer to function as a transmission portion configured to transmit the determination model to the measurement data recording apparatus.

In a tenth aspect of the present invention, a computer readable medium with a program recorded therein is provided. The program may cause a computer to function as an acquisition portion configured to acquire time-series measurement data from a measurement data recording apparatus configured to record the measurement data regarding a state of a target. The program may cause the computer to function as a learning processing portion configured to generate a determination model for determining a quality of the state of the target from the measurement data by learning processing using learning data including the time-series measurement data. The program may cause the computer to function as an analysis portion configured to perform cluster analysis on a plurality of pieces of time-series measurement data measured in a case where the state of the target is not good. The program may cause the computer to function as a specification portion configured to specify a cluster into which one time-series measurement data is to be classified in response to that one time-series measurement data is input to the determination model and the state of the target is determined as not good.

The summary clause does not necessarily describe all necessary features of the embodiments of the present invention. The present invention may also be a sub-combination of the features described above.

BRIEF DESCRIPTION OF THE DRAWINGS

FIG. 6 illustrates an example of a screen output by a generation apparatus 5A.

FIG. 7 illustrates another example of a screen output by the generation apparatus 5A.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

1. First Embodiment

[1.1. Configuration of System 1]

Figure 1:
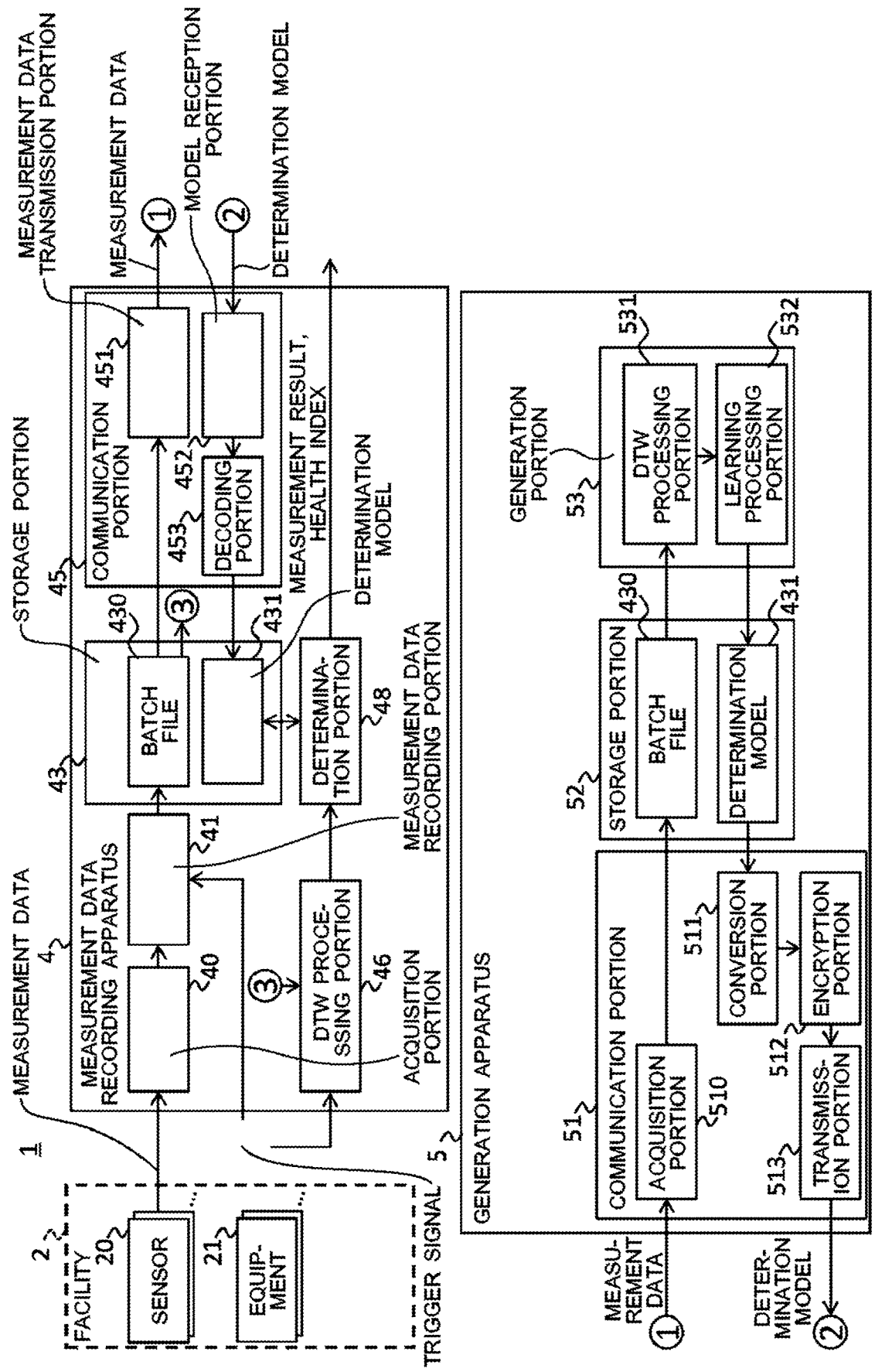
FIG. 1 illustrates a system 1 according to a first embodiment.

FIG. 1 illustrates a system 1 according to a first embodiment. The system 1 supports state monitoring of a target, and includes a facility 2 as an example of the target, a measurement data recording apparatus 4, and a generation apparatus 5.

[1.1-1. Facility 2]

The facility 2 is provided with one or more sensors 20. The facility 2 may further be provided with a plurality of pieces of equipment 21.

For example, the facility 2 may be a plant or a composite apparatus obtained by combining the plurality of pieces of equipment 21. Examples of the plant include, in addition to industrial plants such as chemical plants and bio plants, plants that manage and control well sources such as gas fields and oil fields and surroundings thereof, plants that manage and control power generation such as hydraulic power, thermal power, and nuclear power, plants that manage and control environmental power generation such as solar power and wind power, and plants that manage and control water supplies/sewage, dams, and the like.

[1.1-1-1. Equipment 21]

Each piece of equipment 21 is an instrument, a machine, or an apparatus, and may be, for example, an actuator such as a valve, a pump, a heater, a fan, a motor, or a switch that controls at least one physical quantity such as pressure, temperature, pH, speed, or flow rate in a process of the facility 2. Respective pieces of equipment 21 may be of different types, or at least some (two or more) pieces of equipment 21 may be of the same type. In the present embodiment, as an example, the equipment 21 is controlled from the outside in a wired or wireless manner, but may be controlled manually.

[1.1-1-2. Sensor 20]

Each sensor 20 measures the state of the facility 2. The sensor 20 may measure at least one physical quantity such as pressure, temperature, pH, velocity, flow rate, and the like. In addition, the sensor 20 may measure the yield of the facility 2, the proportion of impurities to be mixed, the operation status of each piece of equipment 21, and the like. The sensors 20 may be of different types, or at least some (two or more) of the sensors 20 may be of the same type. Each sensor 20 may supply measurement data to the measurement data recording apparatus 4.

Note that communication between the sensor 20 and the measurement data recording apparatus 4 may be performed by, for example, a wireless communication protocol of ISA (International Society of Automation), and may be performed by, for example, ISA 100, HART (Highway Addressable Remote Transducer) (registered trademark), BRAIN (registered trademark), FOUNDATION Fieldbus, PROFIBUS, or the like.

[1.1-2. Measurement Data Recording Apparatus 4]

The measurement data recording apparatus 4 records measurement data by each sensor 20. The measurement data recording apparatus 4 includes an acquisition portion 40, a measurement data recording portion 41, a storage portion 43, a communication portion 45, a DTW processing portion 46, and a determination portion 48.

[1.1-2-1. Acquisition Portion 40]

The acquisition portion 40 acquires time-series measurement data obtained by measuring the state of the facility 2. The acquisition portion 40 may sequentially acquire measurement data from each sensor 20. The acquisition portion 40 may acquire a plurality of types (also referred to as channels) of measurement data. In the present embodiment, the channel of the measurement data may be different for each sensor 20 as an example, but may be different depending on a target physical quantity. The acquisition portion 40 may supply the acquired measurement data to the measurement data recording portion 41.

[1.1-2-2. Measurement Data Recording Portion 41]

The measurement data recording portion 41 records the measurement data acquired by the acquisition portion 40. The measurement data recording portion 41 may record the measurement data in the storage portion 43.

The measurement data recording portion 41 may record the measurement data in a chronological order. For example, the measurement data recording portion 41 may collectively record time-series measurement data in a single file (also referred to as a batch file 430) each time processing (also referred to as batch processing) repeatedly executed in the facility 2 is performed. Each batch file 430 may store a plurality of pieces of time-series measurement data (also referred to as batch data) for each channel during the batch processing. In response to the input of a trigger signal, the measurement data recording portion 41 may convert the measurement data supplied from the acquisition portion 40 into a file and record the file.

Here, the batch processing may be, for example, manufacturing processing of a product such as a tire, or heating processing of a retort food, a furnace, or the like. In addition, the trigger signal may be supplied to the measurement data recording apparatus 4 when the batch processing is completed in the facility 2, may be supplied from the equipment 21 or the sensor 20 of the facility 2, or may be supplied from the outside (as an example, from an operator).

The measurement data recording portion 41 may add the measurement time and the identification information of the measured sensor 20 to the measurement data and the batch data, and record the data in the storage portion 43. The measurement time of the measurement data may be a time when the measurement data is measured, and may indicate a measurement timing in batch processing. In the present embodiment, as an example, the measurement time may indicate an elapsed time from the start time of the batch processing. The measurement time of the measurement data may be an acquisition time of the measurement data by the acquisition portion 40. Note that the measurement time and the identification information of the sensor 20 may be added in advance to the measurement data supplied from the sensor 20.

In addition, the measurement data recording portion 41 may further add various types of information to the measurement data, the batch data, and the batch file 430 according to an operation from the outside by an operator or the like. The information to be added may be, as an example, a type (as an example, Celsius temperature) or a unit (as an example, ° C.) of the physical quantity indicated by the measurement data, various setting contents or control conditions in the facility 2, presence/absence of alarm occurrence, occurrence timing, or the like.

[1.1-2-3. Storage Portion 43]

The storage portion 43 stores various types of information. For example, the storage portion 43 may store the measurement data (in the present embodiment, as an example, the batch file 430 that collects time-series measurement data measured by each sensor 20 during execution of batch processing) supplied from the measurement data recording portion 41, and a determination model 431 supplied from the generation apparatus 5 to be described later. Note that the determination model 431 may be stored in the storage portion 43 in response to being supplied from the generation apparatus 5 to the measurement data recording apparatus 4 via the communication portion 45.

[1.1-2-3-1. Determination Model 431]

The determination model 431 determines the quality of the state of the facility 2 from the measurement data. The determination model 431 may output a determination result as to whether the state is good or defective in response to the input of the measurement data. In the present embodiment, as an example, the determination model 431 may perform the quality determination from the time-series measurement data (that is, the batch data) included in the batch file 430.

The determination model 431 may be a functional expression having a value corresponding to the measurement value of the measurement data as a variable. As an example, the functional expression of the determination model 431 may be the following Expression (1) or Expression (2).

$$f(x) = A \times X_1 + B \times X_2 + C \times X_3 + D \times X_4 \qquad (1)$$

$$f(x) = (A \times X_1 + B \times X_2)/C \times X_3 \qquad (2)$$

Here, "A", "B", and so on in the expression are coefficients, and may indicate specific numerical values such as "4.3" and "3.5". In addition, "$X_1$", "$X_2$", and so on in the expression are values corresponding to the measurement value of the measurement data, may be the measurement value itself of the measurement data for each sensor or each measurement time, may be an average and a variance of the measurement values included in the batch data, or may be a parameter calculated by the DTW processing portion 46 to be described later.

The value acquired from the determination model 431 (in the present embodiment, a functional expression as an example) corresponding to the measurement value of the measurement data may be an example of an index value (also referred to as a state index value) indicating the state of the facility 2. The determination model 431 may output a determination result corresponding to a difference (also referred to as a health index) between the state index value and a determination threshold value. In the present embodiment, as an example, the determination model 431 may use 0 as a determination threshold value and output a determination result indicating that the state is good according to the health index being a positive value.

Note that the determination model 431 stored in the storage portion 43 may be indicated by a processing code that can be executed in the measurement data recording apparatus 4. In the present embodiment, as an example, the determination model 431 is described in C language, but may be described in another language such as Basic.

[1.1-2-4. Communication Portion 45]

The communication portion 45 communicates with the generation apparatus 5. The communication portion 45 may perform wireless communication or wired communication. The communication portion 45 may perform communication via a relay equipment (as an example, a mobile terminal such as a smartphone or a stationary gateway apparatus). The communication portion 45 includes a measurement data transmission portion 451, a model reception portion 452, and a decoding portion 453.

[1.1-2-4-1. Measurement Data Transmission Portion 451]

The measurement data transmission portion 451 transmits the measurement data recorded in the storage portion 43 to the generation apparatus 5. The measurement data transmission portion 451 may transmit the measurement data as the batch file 430.

[1.1-2-4-2. Model Reception Portion 452]

The model reception portion 452 receives the determination model 431 generated by the generation apparatus 5. The model reception portion 452 may make the determination model 431 available from determination portion 48 in response to reception of information indicating validity of the determination model 431 together with determination model 431. For example, the model reception portion 452 may supply the determination model 431 to the storage portion 43 in response to reception of information indicating validity together with the determination model 431. However, the model reception portion 452 may store the determination model 431 in the storage portion 43 regardless of whether the information indicating validity is received, and set the determination model 431 to be accessible from the determination portion 48 in response to reception of the information indicating validity. The information indicating validity may be an electronic signature or header information attached to the head of a communication packet.

In the present embodiment, as an example, the model reception portion 452 receives the encrypted determination model 431. Therefore, the model reception portion 452 may supply the received determination model 431 to the storage portion 43 via the decoding portion 453.

[1.1-2-4-3. Decoding Portion 453]

The decoding portion 453 decodes the determination model 431 which has been encrypted and received by the model reception portion 452. The decoding portion 453 may perform decoding using a decoding key corresponding to a key of encryption which is performed by the generation apparatus 5. The decoding portion 453 may supply the decoded determination model 431 to the storage portion 43.

[1.1-2-5. DTW Processing Portion 46]

The DTW processing portion 46 performs DTW processing on time-series measurement data (that is, batch data). The DTW processing may be processing of aligning a time width of other time-series measurement data (also referred to as target batch data) with respect to one time-series measurement data (also referred to as reference batch data) for each channel of the measurement data, and determining a DTW path in which a distance of each point of the other time-series measurement data is minimized with respect to each point of the one time-series measurement data. Additionally or alternatively, the DTW processing may be processing of aligning the time width of the target batch data with respect to the reference batch data and minimizing a difference in the waveform of the target batch data with respect to the reference batch data.

Here, the target batch data may be batch data included in the latest batch file 430. The reference batch data may be selected from batch data in a state where the facility 2 is good, may be, as an example, batch data selected by an operator, may be batch data having a median time width from the head to the tail among a plurality of pieces of batch data, or may be batch data having the smallest sum of DTW distances with other batch data among the plurality of pieces of batch data. In a case where there are a plurality of channels of measurement data, in other words, a case where each batch file 430 includes the plurality of pieces of batch data, the reference batch data for each channel may be batch data included in the same batch file 430.

In response to the input of the trigger signal, the DTW processing portion 46 may read the reference batch data and the target batch data from the storage portion 43 and perform the DTW processing. The DTW processing portion 46 may supply, to the determination portion 48, the target batch data (also referred to as target batch data subjected to the DTW processing) in which a difference in the waveform with respect to the reference batch data is minimized. In addition, the DTW processing portion 46 may further supply at least one parameter calculated by the DTW processing to the determination portion 48.

The parameter calculated by the DTW processing portion 46 may be a DTW distance between the reference batch data and the target batch data. Additionally or alternatively, the parameter calculated by the DTW processing portion 46 may be the number of pieces of measurement data shifted in a time axis direction in the DTW path among pieces of measurement data of each point included in the target batch data. Additionally or alternatively, the parameter calculated by the DTW processing portion 46 may be the number of pieces of measurement data not shifted in the time axis direction in the DTW path among pieces of measurement data of each point included in the target batch data. Shifting the measurement data in the time axis direction means that the measurement time indicating the measurement timing is shifted later in the present embodiment as an example, but additionally or alternatively, the measurement time indicating the measurement timing may be shifted earlier.

[1.1-2-6. Determination Portion 48]

The determination portion 48 determines the quality of the state of the facility 2 from the newly acquired measurement data using the determination model 431 in the storage portion 43. The determination portion 48 may determine the quality of the state of the facility 2 when the target batch data is measured from the newly acquired time-series measurement data, that is, the target batch data. For example, the determination portion 48 may perform determination from batch data subjected to the DTW processing by the DTW processing portion 46. In addition, the determination portion 48 may perform determination from each batch data in the latest batch file 430, or may perform determination from a value (the measurement value itself, the average and variance of the measurement values included in batch data, and parameter calculated by the DTW processing portion 46) corresponding to each measurement data in the batch data. For example, the determination portion 48 may perform determination using a health index that is a difference between a determination threshold value in the determination model 431 and a state index value acquired from the determination model 431 according to the measurement value of each measurement data. In the present embodiment, as an example, the determination portion may determine that the state of the facility 2 is good in a case where the health index is positive, and may determine that the state is defective in a case where the health index is negative. Note that, in a case where the average and the variance of the measurement values included in the batch data is used for determination, the determination portion 48 may calculate the average and the variance.

The determination portion 48 may output a determination result. In addition, the determination portion 48 may output at least the latest one health index. As an example, the determination portion 48 may output the health index for each of the latest one batch processing or the latest two batch processing, or may further output the health index for the batch processing performed four times before. The latest two batch processing may be the last batch processing and the batch processing performed one time before the last.

[1.1-3. Generation Apparatus 5]

The generation apparatus 5 generates the determination model 431. The generation apparatus 5 includes a communication portion 51, a storage portion 52, and a generation portion 53. Note that the generation apparatus 5 may be one or more computers, may be configured by a PC or the like, or may be realized by cloud computing.

[1.1-3-1. Communication Portion 51]

The communication portion 51 communicates with the measurement data recording apparatus 4. The communication portion 51 may perform wireless communication or wired communication. The communication portion 51 includes an acquisition portion 510, a conversion portion 511, an encryption portion 512, and a transmission portion 513.

[1.1-3-1-1. Acquisition Portion 510]

The acquisition portion 510 acquires measurement data from the measurement data recording apparatus 4. The acquisition portion 510 may supply the acquired measurement data to the storage portion 52.

[1.1-3-1-2. Conversion Portion 511]

The conversion portion 511 converts the determination model 431 generated by the generation portion 53 to be described later into a processing code to be executed in the measurement data recording apparatus 4 (in the present embodiment, as an example, a C language code). The conversion portion 511 may supply the determination model 431 after conversion to the encryption portion 512.

[1.1-3-1-3. Encryption Portion 512]

The encryption portion 512 encrypts the determination model 431. In the present embodiment, as an example, the encryption portion 512 may encrypt the determination model 431 encoded by the conversion portion 511. The encryption portion 512 may supply the encrypted determination model 431 to the transmission portion 513.

[1.1-3-1-4. Transmission Portion 513]

The transmission portion 513 transmits the determination model 431 to the measurement data recording apparatus 4. The transmission portion 513 may transmit the determination model 431 converted by the conversion portion 511. The transmission portion 513 may transmit the determination model 431 encrypted by the encryption portion 512.

In addition, the transmission portion 513 may transmit information indicating validity of the determination model 431 together with the determination model 431. The transmission portion 513 may transmit an electronic signature indicating validity and header information of a communication packet together with determination model 431.

[1.1-3-2. Storage Portion 52]

The storage portion 52 stores various types of information. For example, the storage portion 52 may store the measurement data supplied from the acquisition portion 510 and the determination model 431 supplied from the generation portion 53.

The storage portion 52 may store the measurement data as the batch file 430. A label indicating the quality of the state of the facility 2 when the measurement data is measured may be added to the measurement data stored in the storage portion 52. This label may be set by an operator via an input portion (not illustrated), or may be added in advance by the measurement data recording portion 41 of the measurement data recording apparatus 4 as information indicating the presence/absence of alarm occurrence.

The determination model 431 stored in the storage portion 52 may not be described by a processing code that can be executed in the measurement data recording apparatus 4, but may be described by a processing code which is executable in the generation apparatus 5.

[1.1-3-3. Generation Portion 53]

The generation portion 53 generates the determination model 431 using the time-series measurement data acquired by the acquisition portion 510. The generation portion 53 includes a DTW processing portion 531 and a learning processing portion 532.

[1.1-3-3-1. DTW Processing Portion 531]

The DTW processing portion 531 performs DTW processing on the time-series measurement data (that is, batch data). For each channel of the measurement data, the DTW processing portion 531 may align a time width of other time-series measurement data as the target batch data with respect to one time-series measurement data as the reference batch data read from the storage portion 52, and perform processing of determining a DTW path in which a distance of each point of the target batch data is minimized with respect to each point of the reference batch data to calculate at least one parameter. In addition, the DTW processing portion 531 may perform processing of aligning the time width of the target batch data with respect to the reference batch data and minimizing a difference in the waveform of the target batch data with respect to the reference batch data.

The DTW processing portion 531 may supply a plurality of pieces of batch data subjected to the DTW processing and the calculated parameter to the learning processing portion 532 for each batch file 430. The parameter calculated by the DTW processing portion 531 may be the same type of parameter as the parameter calculated by the DTW processing portion 46 of the measurement data recording apparatus 4 (in the present embodiment, as an example, the DTW distance, the number of pieces of measurement data shifted in the time axis direction in the DTW path, and the number of pieces of measurement data not shifted in the time axis direction in the DTW path).

Here, the reference batch data may be selected from batch data in a state where the facility 2 is good, may be, as an example, batch data selected by an operator, may be batch data having a median time width from the head to the tail among a plurality of pieces of batch data, or may be batch data having the smallest sum of DTW distances with other batch data among the plurality of pieces of batch data. The reference batch data used by the DTW processing portion 46 of the measurement data recording apparatus 4 and the reference batch data used by the DTW processing portion 531 of the generation apparatus 5 may be the same or different. In a case where there are a plurality of channels of measurement data, in other words, a case where each batch file includes the plurality of pieces of batch data, the reference batch data for each channel may be batch data included in the same batch file 430. The target batch data may be time-series measurement data in a state where the facility 2 is good, or may be time-series measurement data in a case where the facility 2 is defective.

[1.1-3-3-2. Learning Processing Portion 532]

The learning processing portion 532 generates the determination model 431 by learning processing using learning data including time-series measurement data (that is, batch data). A label indicating the quality of the state of the facility 2 may be added to the measurement data included in the learning data. In addition, the learning data may include, for each channel of the measurement data, the average and the variance of the time-series measurement data and the parameters (in the present embodiment, as an example, the DTW distance, the number of pieces of measurement data shifted in the time axis direction in the DTW path, and the number of pieces of measurement data not shifted in the time axis direction in the DTW path) calculated by the DTW processing portion 531. In a case where the learning data includes the average and the variance of the measurement data, the learning processing portion 532 may calculate the average and the variance and include the average and the variance in the learning data. The learning processing portion 532 may supply and store the generated determination model 431 to the storage portion 52, and supply the generated determination model to the conversion portion 511 of the communication portion 51.

According to the measurement data recording apparatus 4 in the system 1 described above, the measurement data is transmitted to the generation apparatus 5 that generates the determination model 431 for determining the quality of the state of the facility 2, and the quality of the state of the facility 2 is determined from the newly acquired measurement data using the determination model 431 received from the generation apparatus 5. Therefore, it is possible to determine the quality of the state of the facility 2 using the generated determination model 431 without generating the determination model 431 in the measurement data recording apparatus 4.

In addition, since the encrypted determination model 431 is decoded, it is possible to prevent the content of the determination model 431 received by the measurement data recording apparatus 4 from being changed. Therefore, it is possible to prevent the determination model 431 changed by a malicious third party from being used in the determination portion 48.

In addition, since the determination model 431 is made available from the determination portion 48 in response to reception of the information indicating validity of the determination model 431 together with the determination model 431, it is possible to prevent the determination model 431 generated by a malicious third party from being used in the determination portion 48.

In addition, since the quality of the state of the facility 2 when the time-series measurement data is measured is determined from the newly acquired time-series measurement data, the state of the facility 2 can be accurately determined as compared with the case where the determination is performed on the basis of the measurement data at one time point.

In addition, since the determination is performed using the health index that is the difference between the determination threshold value in the determination model 431 and the state index value of the facility 2, and the determination result and at least the latest health index are output, the future state of the facility 2 can be accurately predicted.

In addition, according to the generation apparatus 5 in the system 1, the measurement data is acquired from the measurement data recording apparatus 4 to generate the determination model 431, and the determination model is transmitted to the measurement data recording apparatus 4. Therefore, it is possible to determine the quality of the state of the facility 2 using the generated determination model 431 without generating the determination model 431 in the measurement data recording apparatus 4.

In addition, since the encrypted determination model 431 is transmitted, it is possible to prevent the content of the determination model 431 from being changed before being received by the measurement data recording apparatus 4. Therefore, it is possible to prevent the determination model 431 changed by a malicious third party from being used in the determination portion 48.

In addition, since the information indicating validity of the determination model 431 is transmitted together with the determination model 431, it is possible to prevent the determination model 431 generated by a malicious third party from being used in the determination portion 48.

In addition, since the generated determination model 431 is converted into a processing code that can be executed by the measurement data recording apparatus 4 and transmitted, coding of the determination model 431 on the measurement data recording apparatus 4 side can be omitted.

In addition, since the determination model 431 is generated by the learning processing using the learning data including the time-series measurement data, it is possible to generate the determination model 431 capable of accurately determining the state of the facility 2 as compared with the case where the measurement data at one time point is used in the learning data.

In addition, at least one of a parameter indicating the DTW distance, a parameter indicating the number of pieces of measurement data shifted in the time axis direction in the DTW path, and a parameter indicating the number of pieces of measurement data not shifted in the time axis direction in the DTW path is used for generation of the determination model 431. Therefore, unlike the case where the determination model 431 is generated using only the measurement data at each time point included in the time-series measurement data, and the average and the variance thereof, the determination model 431 can be generated in consideration of the deviation in the measurement time point of each measurement data, so that the determination accuracy of the determination model 431 can be improved.

[1.2. Operation of System 1]

Figure 2:
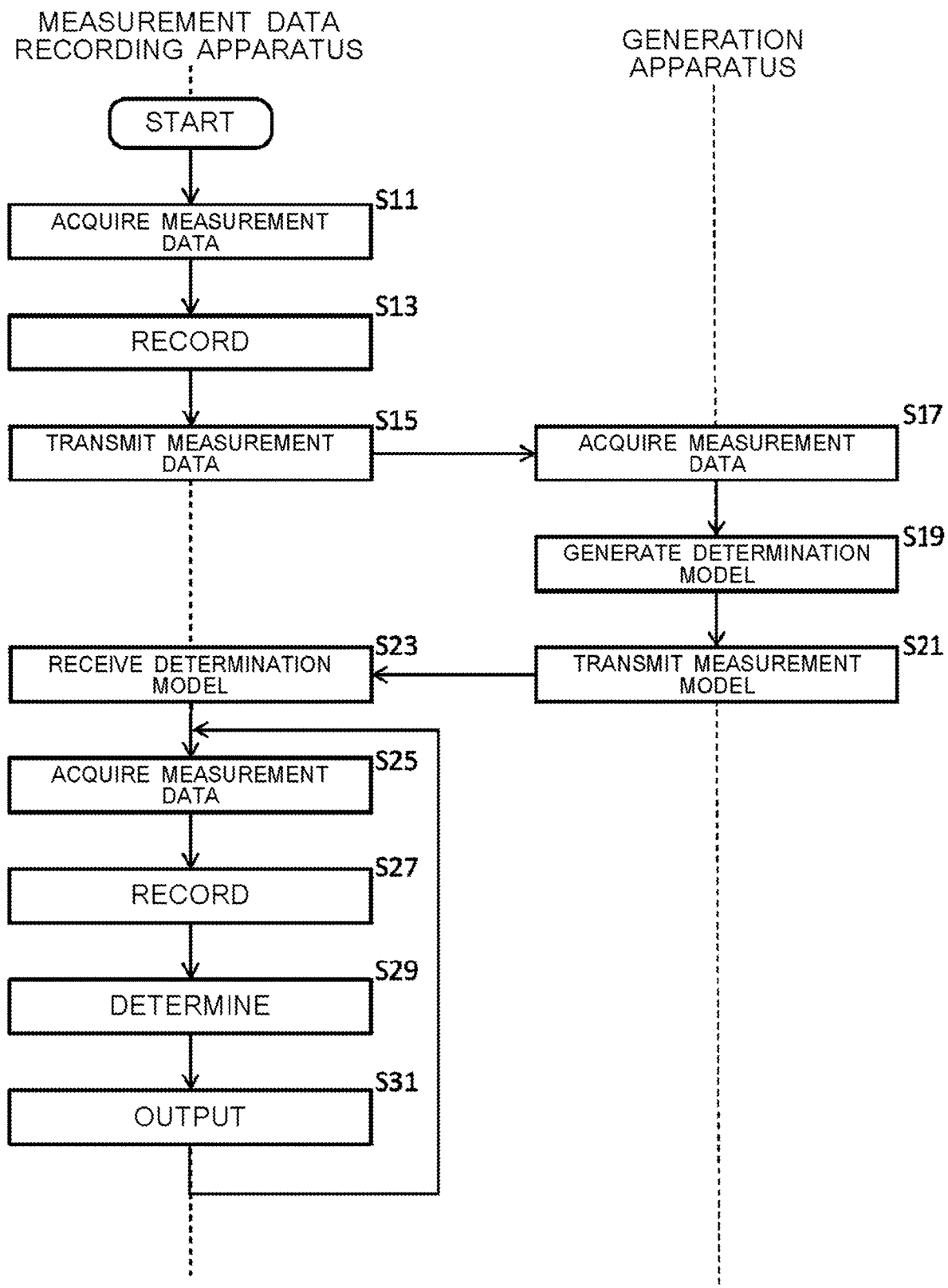
FIG. 2 illustrates the operation of the system 1.

FIG. 2 illustrates an operation of the system 1. The measurement data recording apparatus 4 and the generation apparatus 5 of the system 1 generate the determination model 431 by performing the processes of Steps S11 to S31, and determine the quality of the state of the facility 2. Note that this operation may be started with the activation of the facility 2.

In Step S11, the acquisition portion 40 of the measurement data recording apparatus 4 acquires time-series measurement data obtained by measuring the state of the facility 2 from each sensor 20.

In Step S13, the measurement data recording portion 41 records the measurement data acquired by the acquisition portion 40 in the storage portion 43. The measurement data recording portion 41 may store the batch file 430 of the measurement data in the storage portion 43 each time the batch processing is performed in the facility 2.

In Step S15, the measurement data transmission portion 451 transmits the measurement data recorded in the storage portion 43 to the generation apparatus 5. In the present embodiment, as an example, the measurement data transmission portion 451 transmits the batch file 430 of the measurement data according to the operation from the outside by an operator or the like, but may transmit the batch file 430 each time the batch file 430 is created, or may transmit the batch file 430 created periodically. As a result, in Step S17, the acquisition portion 510 of the generation apparatus 5 acquires the measurement data from the measurement data recording apparatus 4. The acquisition portion 510 may supply the acquired measurement data to the storage portion 52.

In Step S19, the generation portion 53 generates the determination model 431 using the acquired time-series measurement data. In the present embodiment, as an example, the generation portion 53 generates the determination model 431 according to the operation from the outside by an operator or the like, but may generate the determination model 431 in response to the batch file 430 stored in the storage portion 52 reaching the reference number.

In the generation of the determination model 431, the DTW processing portion 531 of the generation portion 53 may perform processing of minimizing a difference in the waveform of other time-series measurement data as the target batch data with respect to one time-series measurement data as the reference batch data read from the storage portion 52 by the dynamic time warping method for each channel of the measurement data so as to calculate the DTW distance, the number of pieces of measurement data shifted in the time axis direction in the DTW path, and the number of pieces of measurement data not shifted in the time axis direction in the DTW path.

In addition, the learning processing portion 532 may generate the determination model 431 by learning processing using learning data including time-series measurement data (that is, batch data). A label indicating the quality of the state of the facility 2 may be added to the measurement data included in the learning data. The learning data may include, for each channel of the measurement data, the average and the variance of the time-series measurement data and a parameter calculated by the DTW processing portion.

The learning processing portion 532 may store in advance at least one functional expression (as an example, the above Expressions (1) and (2)) to be the determination model 431, and may generate the determination model 431 by tuning the coefficients of the functional expression by learning processing. For example, the learning processing portion 532 may tune the coefficient of the relational expression so as to increase the correlation between the difference between the value of the expression and the determination threshold value when the value corresponding to the measurement value of the measurement data in each batch file 430 is input to the functional expression of the determination model 431 and the quality state of the facility 2 indicated by the label added to the measurement data of the batch file 430.

Note that the value corresponding to the measurement value of the measurement data may be the measurement value of the measurement data itself, may be the average and the variance of the measurement values of each measurement data included in the batch data, or may be a parameter calculated by the DTW processing portion 531. In a case where the learning processing portion 532 stores a plurality of functional expressions, a functional expression to be tuned may be automatically selected, or may be selected according to the operation from the outside by an operator or the like.

When the determination model 431 is generated, in Step S21, the transmission portion 513 transmits the determination model 431 to the measurement data recording apparatus 4. In the present embodiment, as an example, the transmission portion 513 may transmit the determination model 431 converted by the conversion portion 511 into a code executable by the measurement data recording apparatus 4 and encrypted by the encryption portion 512 together with information indicating validity (as an example, an electronic signature or header information attached to the head of the communication packet).

In Step S23, the model reception portion 452 of the measurement data recording apparatus 4 receives the determination model 431 generated by the generation apparatus 5. The model reception portion 452 may cause the decoding portion 453 to decode the determination model 431 in response to reception of the information indicating validity of the determination model 431 together with the determination model, and then store the determination model in the storage portion 43, so that the determination model 431 can be used from the determination portion 48.

In Step S25, the acquisition portion 40 newly acquires time-series measurement data, and in Step S27, the measurement data recording portion 41 records the acquired measurement data in the storage portion 43. The measurement data recording portion 41 may store the batch file 430 of the measurement data in the storage portion 43 each time the batch processing is performed in the facility 2. [0097] In Step S29, the determination portion 48 determines the quality of the state of the facility 2 from the batch file 430 of the newly acquired measurement data using the received determination model 431. The determination portion 48 may perform determination from each batch data in the batch file 430 subjected to the DTW processing by the DTW processing portion 46. In the present embodiment, as an example, the determination portion 48 may perform determination using the health index.

Then, in Step S31, the determination portion 48 outputs the determination result and at least the latest health index. The determination portion 48 may output the transition of a plurality of latest recent health indexes. When the process in Step S31 is completed, the measurement data recording apparatus 4 may shift the process to Step S25 described above. The plurality of latest health indexes may be a plurality of health indexes in order from a current time point.

[1.3. Transition of Health Index]

Figure 3:
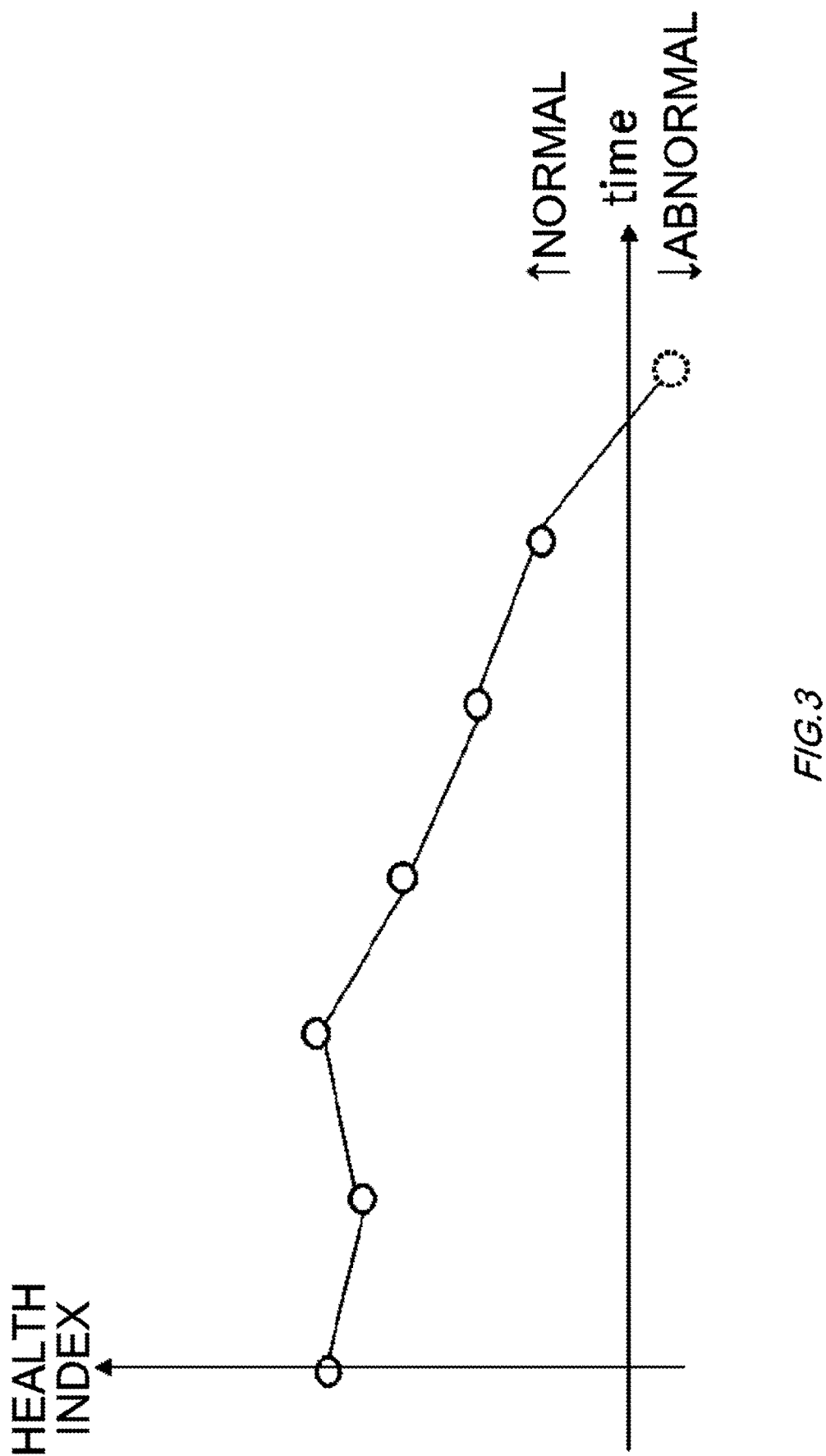
FIG. 3 illustrates health index transitions.

FIG. 3 illustrates the transition of the health index. In the drawing, the vertical axis represents the health index, and the horizontal axis represents the elapsed time in a case where the batch processing is repeatedly executed or the number of times of batch processing. In addition, a solid line plot indicates the health index according to the measurement data, and a broken line plot indicates the health index predicted by the operator when the next batch processing is performed. In this way, it is possible to predict the quality of the facility 2 based on the transition of the health index.

[1.4. Modification]

Note that, in the first embodiment described above, it has been described that the model reception portion 452 of the measurement data recording apparatus 4 receives the determination model 431 from the generation apparatus 5, but may receive a parameter indicating the content of the determination model 431. For example, a plurality of functional expressions into which coefficients can be substituted may be stored in the storage portion 43 of the measurement data recording apparatus 4, and the model reception portion 452 may receive any one of these functional expressions and the value of each coefficient in the functional expression of the expression number from the generation apparatus 5. In this case, the measurement data recording apparatus 4 may generate the determination model 431 in the storage portion 43 according to these parameters.

In addition, it has been described that the model reception portion 452 receives the determination model 431 indicated by the code of the processing executable by the measurement data recording apparatus 4, but may receive the determination model 431 which is not indicated by the executable processing code. In this case, the measurement data recording apparatus 4 may convert the determination model 431 to be executable using a compiler (not illustrated), and store the converted determination model in the storage portion 43.

In addition, it has been described that the measurement data recording apparatus 4 includes the determination model 431 in the storage portion 43, but may not have the determination model 431. In this case, the generation apparatus 5 may store the generated determination model 431 in an external storage apparatus externally connected to the measurement data recording apparatus 4, and the determination portion 48 of the measurement data recording apparatus 4 may perform determination using the determination model 431 in the external storage apparatus.

2. Second Embodiment

Figure 4:
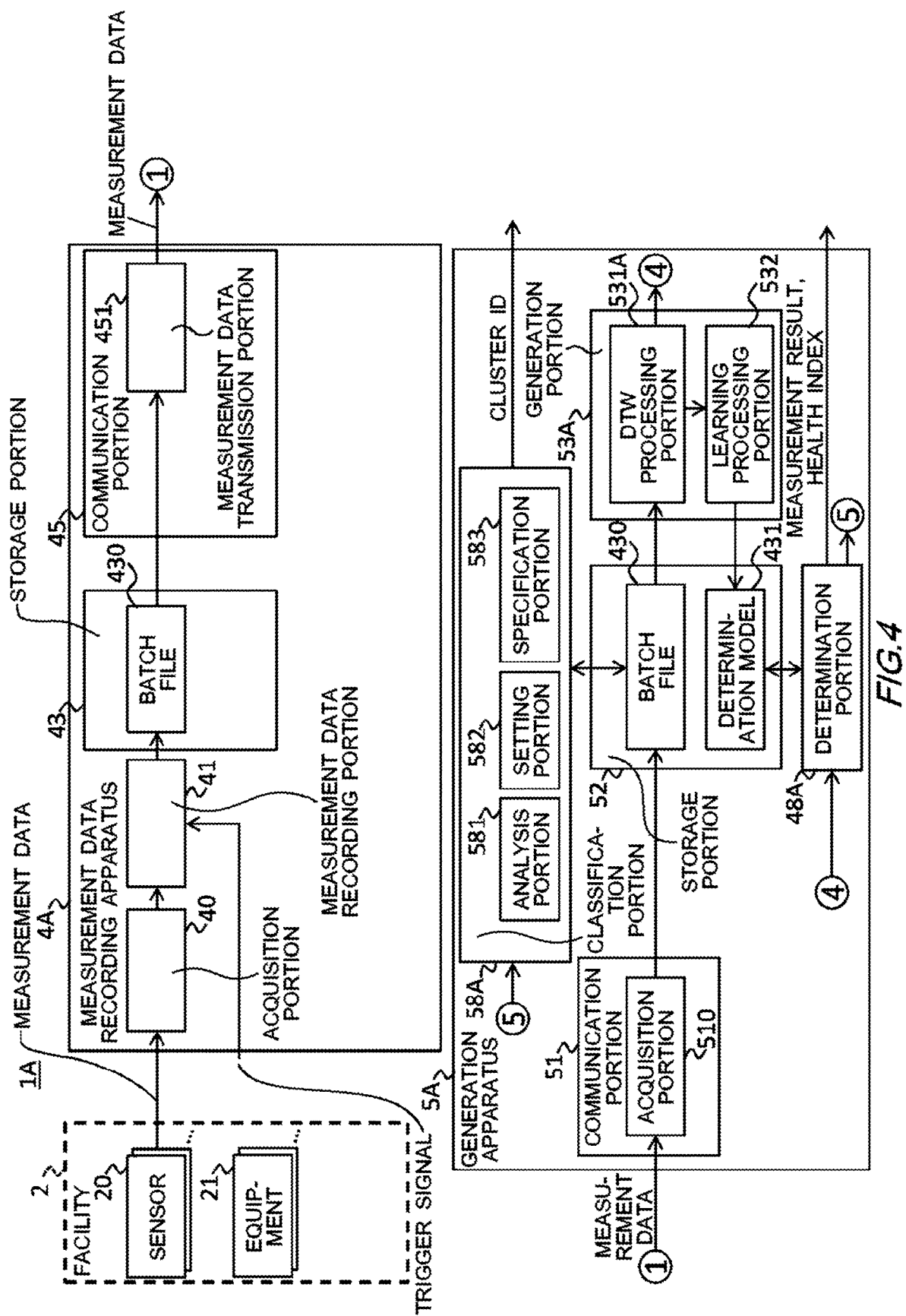
FIG. 4 illustrates a system 1A according to a second embodiment.

FIG. 4 illustrates a system 1A according to a second embodiment. The system 1A is provided with a measurement data recording apparatus 4A and a generation apparatus 5A. Note that, in the system 1A according to the present embodiment, substantially the same components as those of the system 1 illustrated in FIG. 1 are denoted by the same reference numerals, and the description thereof will be omitted.

[2.1. Measurement Data Recording Apparatus 4A]

The measurement data recording apparatus 4A transmits the batch file 430 of the measurement data from the communication portion 45 to the generation apparatus 5.

[2.2. Generation Apparatus 5A]

The generation apparatus 5A includes a generation portion 53A, a determination portion 48A, and a classification portion 58A.

[2.2-1. Generation Portion 53A]

The generation portion 53A includes a DTW processing portion 531A. Before the generation of the determination model 431, the DTW processing portion 531A performs the same processing as that of the DTW processing portion 531 in the first embodiment.

In addition, after the generating if the determination model 431, the DTW processing portion 531A also performs DTW processing on newly acquired time-series measurement data (that is, batch data). For example, the DTW processing portion 531 may read the reference batch data and the target batch data from the storage portion 52 for each channel of the measurement data and perform the DTW processing according to an operation from the outside by an operator or the like. The reference batch data before the generation of the determination model 431 and the reference batch data after the generation of the determination model 431 may be the same or different. The target batch data may be batch data included in the latest batch file 430.

The DTW processing portion 531 may supply the target batch data subjected to the DTW processing after the generation of the determination model 431 to the determination portion 48A. In addition, the DTW processing portion 531 may further supply at least one parameter calculated by the DTW processing to the determination portion 48A.

[2.2-2. Determination Portion 48A]

The determination portion 48A performs the same processing as that of the determination portion 48 of the measurement data recording apparatus 4 in the embodiment. In addition, in a case where the determination portion 48A determines that the state of the facility 2 is defective, that is, not good, the determination portion may supply the determination result and the batch file 430 to the classification portion 58A.

[2.2-3. Classification Portion 58A]

The classification portion 58A classifies a defective state of the facility 2. The classification portion 58A includes an analysis portion 581, a setting portion 582, and a specification portion 583.

[2.2-3-1. Analysis Portion 581]

The analysis portion 581 performs cluster analysis on a plurality of pieces of time-series measurement data measured in a case where the state of the facility 2 is not good.

The analysis portion 581 may perform cluster analysis on the batch file 430 measured when the state of the facility 2 is not good among the plurality of batch files 430 stored in the storage portion 52. The batch file 430 measured when the state of the facility 2 is not good may be the batch file 430 including the measurement data to which a label indicating that the state of the facility 2 is not good is attached, or may be the batch file 430 of the measurement data measured when the operator or the determination portion 48A determines that the state of the facility 2 is defective.

The analysis portion 581 may perform cluster analysis on the plurality of batch files 430 to generate a plurality of clusters into which the batch files 430 are classified. For each generated cluster, the analysis portion 581 may supply identification information (also referred to as a batch file ID) of the batch file 430 belonging to the cluster to the setting portion 582.

[2.2-3-2. Setting Portion 582]

The setting portion 582 sets identification information (also referred to as a cluster ID) for a cluster of the measurement data classified by the analysis portion 581 on the basis of the operation from the outside by an operator or the like. The setting portion 582 may store the batch file ID of the batch file 430 for each cluster supplied from the analysis portion 581 and the cluster ID of the cluster in the storage portion 52 in association with each other.

The cluster ID may indicate a type of the defective state of the facility 2. In the present embodiment, as an example, the cluster ID may be set by an operator so as to indicate a factor that deteriorates the state of the facility 2 or a name of the defective state.

Note that the cluster ID may be set by the operator after the generation of the cluster by the analysis portion 581, or may be set by an operator before the generation of the cluster. In a case where the cluster ID is set before the generation of the cluster, the cluster ID set by an operator for at least one of the batch files 430 before classification may be set for the cluster including the batch file 430.

[2.2-3-3. Specification Portion 583]

The specification portion 583 specifies a cluster into which the one time-series measurement data is to be classified in response to that the one time-series measurement data is input to the determination model 431 and the state of the facility 2 is determined as defective. In the present embodiment, as an example, the specification portion 583 may store the distribution range of the measurement data in the batch file 430 in advance for each cluster, and in a case where the batch data of the new batch file 430 is input to the determination model 431 and it is determined that the state of the facility 2 is defective, the specification portion 583 may specify the cluster in which the batch file 430 is to be included on the basis of whether the measurement data of the batch file 430 is included in the distribution range of the measurement data of any cluster. Alternatively, the specification portion 583 may cause the analysis portion 581 to perform cluster analysis again to specify the cluster into which the batch file 430 is classified.

The specification portion 583 may output the content or distribution diagram of each batch file 430 included in the specified cluster, or may output the cluster ID set in the specified cluster. In a case where outputting and displaying the distribution diagram of the batch files 430 included in the specified cluster, the specification portion 583 may display the distribution of the batch files 430 included in other clusters together while displaying the cluster in an identifiable manner. In addition, the specification portion 583 may display the cluster ID in association with each cluster. As a result, the cluster ID and the distribution of the batch files 430 are displayed for each cluster. In a case where the cluster ID is not set, the display region of the cluster ID may be displayed in a blank, and the cluster ID may be set by the setting portion 582 in response to the operator's inputting of the cluster ID in the blank.

According to the generation apparatus 5A of the system 1A described above, a cluster into which the one time-series measurement data is to be classified in response to that the one time-series measurement data is input to the determination model 431 and the state of the facility 2 is determined as defective is specified. Therefore, in a case where it is determined from the time-series measurement data that the state is not good, it is possible to specify the tendency and factor of the defect and the name of the defective state.

In addition, since the identification information (in the present embodiment, as an example, the cluster ID indicating the factor of the defect or the name of the defective state) set to the specified cluster is output, the name of the defective state or the factor can be easily specified.

[2.3. Distribution Diagram of Batch Files]

Figure 5:
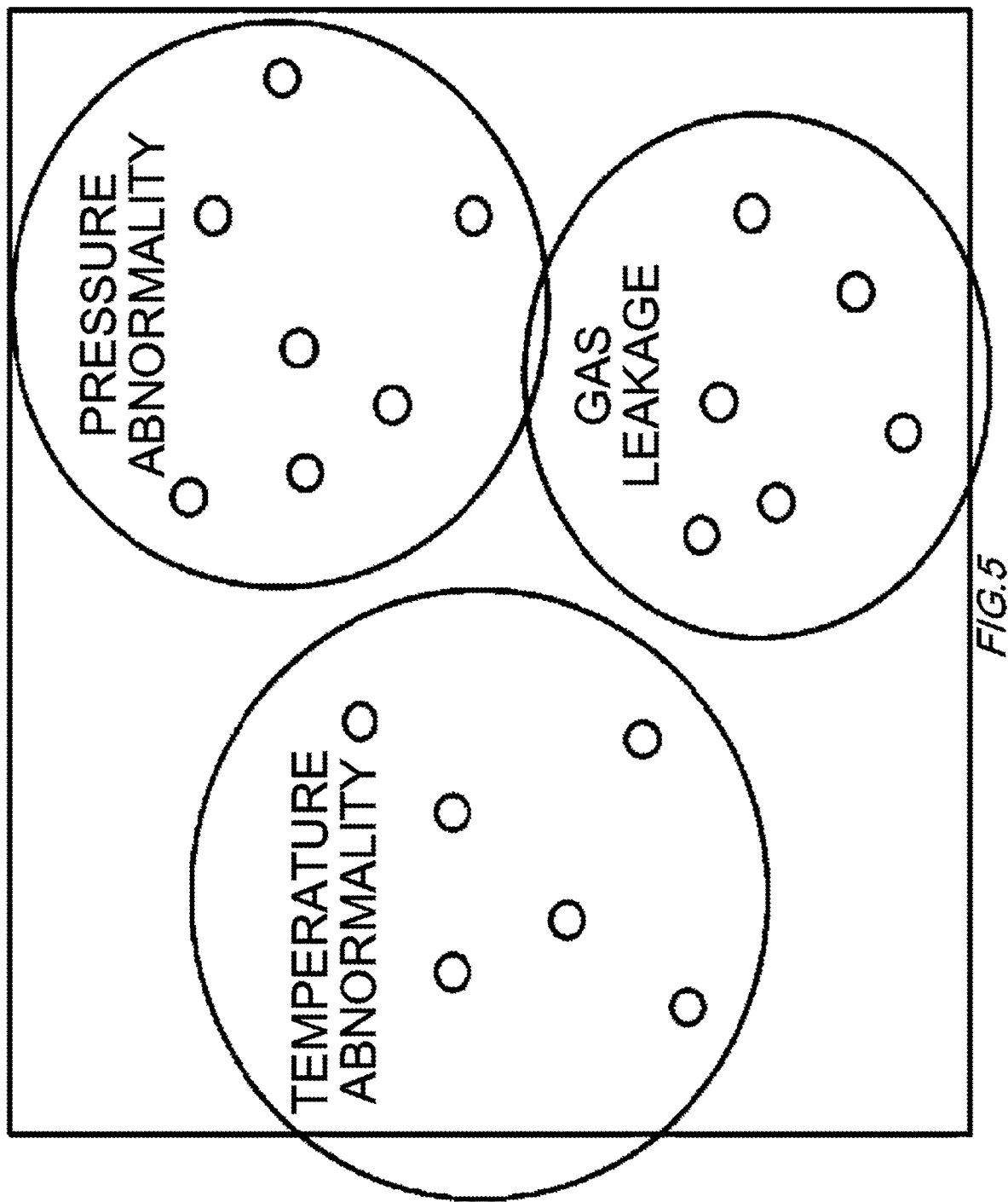
FIG. 5 is a distribution diagram of clustered batch files 430.

FIG. 5 is a distribution diagram of the clustered batch files 430. In this diagram, each batch file 430 is illustrated as a plot, and cluster IDs of "temperature abnormality", "pressure abnormality", and "gas leakage" are set for the clusters. In a case where any of the clusters is specified by the specification portion 583, the cluster may be displayed to be identified by changing the display color of the cluster to another cluster.

[2.4. Example of Output Screen]

FIG. 6 illustrates an example of a screen output by the generation apparatus 5A. The generation apparatus 5A may output, as the determination result of the batch file 430, the quality "NG" of the state of the facility 2, the health index "−0.246" calculated from the batch file 430, the determination time by the determination portion 48A, the cluster ID (abnormality factor in this drawing) "gas leakage" of the cluster into which the batch file 430 is to be classified, and the like.

FIG. 7 illustrates another example of the screen output by the generation apparatus 5A. The generation apparatus 5A may output, for each batch file 430, a determination result, a health index, a cluster ID (abnormality factor in this drawing) of a cluster into which the batch file 430 is to be classified, and the like. Note that, in this drawing, the information of each batch file 430 is displayed in the order of determination by the determination portion 48A.

[2.5. Modification]

Note that, in the second embodiment described above, it has been described that the generation apparatus 5A determines the quality of the state, but similarly to the first embodiment described above, the measurement data recording apparatus 4A may determine the quality of the state using the determination model 431. In this case, the generation apparatus 5A may specify the cluster ID of the defective state in response to determination that the state is defective in the measurement data recording apparatus 4A.

In addition, the description has been given assuming that the generation apparatus 5A specifies the cluster ID of the defective state, the measurement data recording apparatus 4A may specify the cluster ID of the defective state. In this case, the measurement data recording apparatus 4A may include the specification portion 583 or the classification portion 58A.

In addition, it has been described that the generation apparatus 5A includes the setting portion 582, but may not include the setting portion 582. In this case, the specification portion 583 may output the content and the distribution diagram of each batch file 430 included in the specified cluster. In this case, the name of the defective state, the factor of the defect, and the tendency can be specified from the content of the output batch file 430.

3. Third Embodiment

Figure 8:
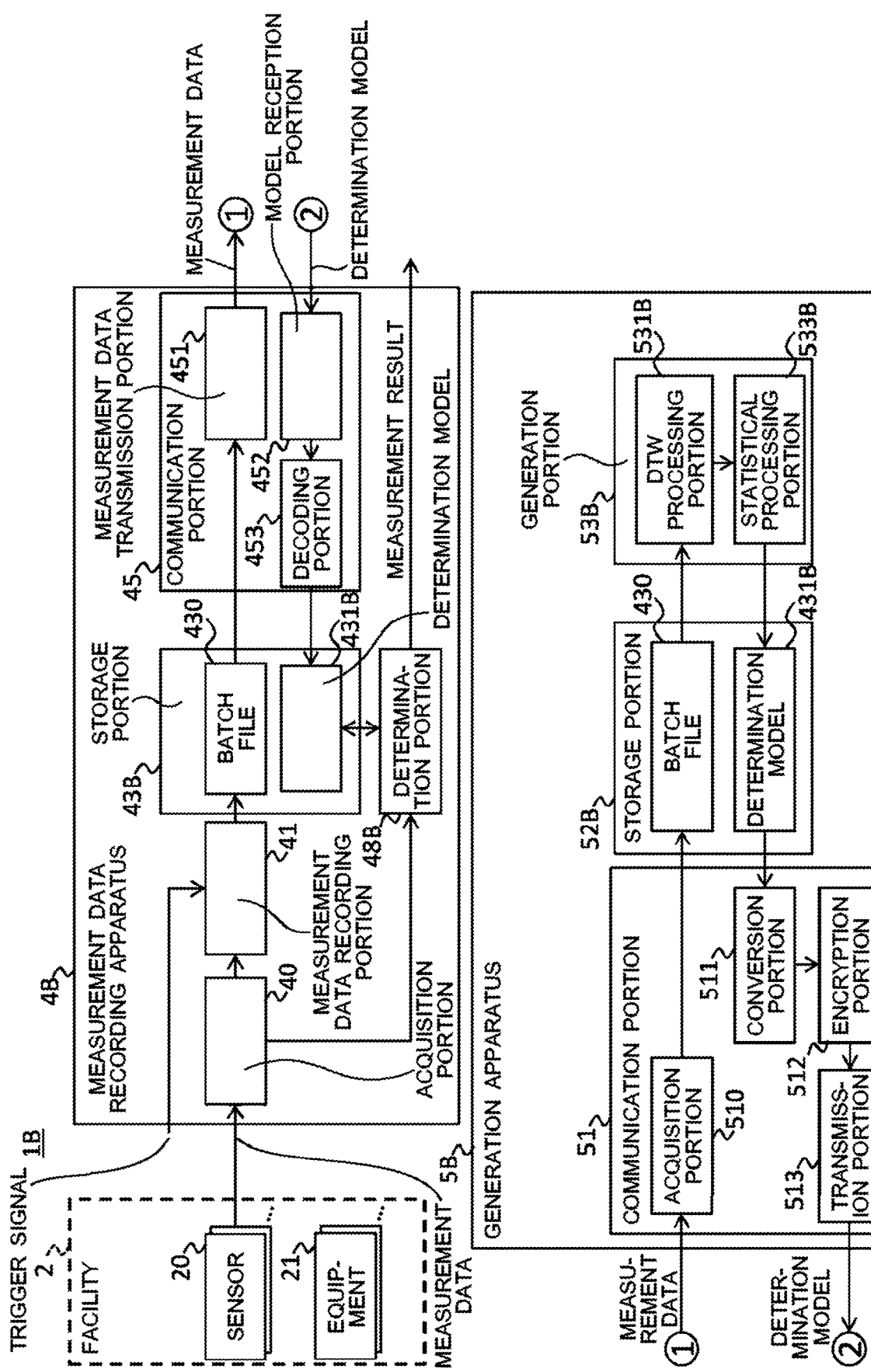
FIG. 8 illustrates a system 1B according to a third embodiment.

FIG. 8 illustrates a system 1B according to a third embodiment. The system 1B includes a measurement data recording apparatus 4B and a generation apparatus 5B. Note that, in the system 1B according to the present embodiment, substantially the same components as those of the system 1 illustrated in FIG. 1 are denoted by the same reference numerals, and the description thereof will be omitted.

[3.1. Measurement Data Recording Apparatus 4B]

The measurement data recording apparatus 4B includes a storage portion 43B and a determination portion 48B.

[3.1-1. Storage Portion 43B]

The storage portion 43B stores a determination model 431B.

The determination model 431B determines the quality of the state of the facility 2 from the measurement data. The determination model 431B may output the determination result of the quality in response to the input of the measurement data. In the present embodiment, as an example, the determination model 431B may perform the quality determination from measurement data measured at an arbitrary measurement time (as an example, measurement data measured lately).

The determination model 431B may indicate an allowable range (also referred to as an alarm profile) of the measurement data for each elapsed time in processing performed in the facility 2 (in the present embodiment, batch processing as an example). The determination model 431B may indicate an allowable range of the measurement value at each elapsed time of processing for each channel of the measurement data. The allowable range of the measurement data may have at least one of an upper limit value and a lower limit value.

[3.1-2. Determination Portion 48B]

The determination portion 48B uses the determination model 431B to determine the quality of the state of the facility 2 when the measurement data is measured each time the measurement data is acquired. The determination portion 48B may sequentially acquire the measurement data from the acquisition portion 40 after the start of the processing performed in the facility 2, and calculate the elapsed time from the start of the processing performed in the facility 2 to the measurement of the measurement data.

The determination portion 48B may perform determination by comparing a determination threshold value, which is an upper and lower limit values of the allowable range for each elapsed time, with a measurement value of the measurement data. The determination portion 48B may determine that the state is good if the comparison result indicates that the measurement data is within the allowable range, and may determine that the state is defective if the comparison result indicates that the measurement data is outside the allowable range. The determination portion 48B may output the determination result.

[3.2. Generation Apparatus 5B]

The generation apparatus 5B includes a storage portion 52B and a generation portion 53B.

[3.2-1. Storage Portion 52B]

The storage portion 52B stores the determination model 431B. The determination model 431B stored in the storage portion 52B may not be described by a processing code that can be executed in the measurement data recording apparatus 4B, but may be described by a processing code which is executable in the generation apparatus 5B.

[3.2-2. Generation Portion 53B]

The generation portion 53B generates the determination model 431B using the time-series measurement data acquired by the acquisition portion 510. The generation portion 53B includes a DTW processing portion 531B and a statistical processing portion 533B.

[3.2-2-1. DTW Processing Portion 531B]

The DTW processing portion 531B performs DTW processing on the batch data for each channel of the measurement data, similarly to the DTW processing portion 531 of the embodiment. The DTW processing portion 531B may supply batch data obtained by aligning the measurement time with the reference batch data to the statistical processing portion 533B. Note that the DTW processing portion 531B may not calculate the DTW distance, the number of pieces of measurement data shifted in the time axis direction in the DTW path, and the number of pieces of measurement data not shifted in the time axis direction in the DTW path by the DTW processing, and not supply these pieces of information to the statistical processing portion 533B.

[3.2-2-2. Statistical Processing Portion 533B]

For each channel of the measurement data, the statistical processing portion 533B generates an allowable range of the measurement data for each elapsed time in the batch processing, that is, an alarm profile, as the determination model 431B by performing statistical processing on the plurality of pieces of batch data acquired by the acquisition portion 510. The statistical processing portion 533B may perform statistical processing on a plurality of pieces of batch data processed by the DTW processing portion 531B. The statistical processing portion 533B may determine the upper limit value and the lower limit value of the allowable range by performing statistical processing on each channel of the measurement data for each measurement time.

For example, the statistical processing portion 533B may extract the measurement data of each measurement time from the measurement data measured when the state of the facility 2 is good, and determine the upper limit value and the lower limit value for each elapsed time such that all the measurement values are included in the allowable range.

In addition, the statistical processing portion 533B may extract the measurement data of each measurement time from the measurement data measured when the state of the facility 2 is good, regard the distribution of the measurement values as a normal distribution, and determine the upper limit value and the lower limit value for each elapsed time such that the measurement values falling within a section $1a$, a section $2a$, and a section $3a$ of the distribution are included in the allowable range. Note that a is a standard deviation of the measurement value.

In addition, the statistical processing portion 533B may extract the measurement data of each measurement time from the measurement data measured when the state of the facility 2 is good, calculate the average and the variance of the measurement values, and determine the upper limit value and the lower limit value on the basis of the calculation result. In this case, the statistical processing portion 533B may determine the upper limit value and the lower limit value such that the average value becomes an intermediate value between the upper and lower limit values, the larger the variance, the larger the width of the upper and lower limit values, and the smaller the variance, the smaller the width of the upper and lower limit values.

The statistical processing portion 533B may supply and store the generated determination model 431B to the storage portion 52B, and supply the generated determination model to the measurement data recording apparatus 4B via the communication portion 51.

According to the measurement data recording apparatus 4B in the system 1B described above, the quality of the state of the facility 2 when the measurement data is measured is determined using the determination model 431B each time the measurement data is acquired. Therefore, it is possible to sequentially obtain the determination result without waiting until the measurement data is aligned.

In addition, according to the generation apparatus 5B in the system 1B, since the allowable range of the measurement data for each elapsed time in the processing performed in the facility 2 is generated as the determination model 431 by the statistical processing on the plurality of pieces of time-series measurement data for each type, it is possible to generate the determination model 431 capable of determining the quality of the state of the facility 2 when the measurement data is measured each time the measurement data is acquired.

In addition, since the statistical processing is performed on a plurality of pieces of time-series measurement data processed by the DTW processing portion 531, it is possible to align the measurement times and enhance the efficiency of the statistical processing.

[3.3. Example of Alarm Profile]

Figure 9:
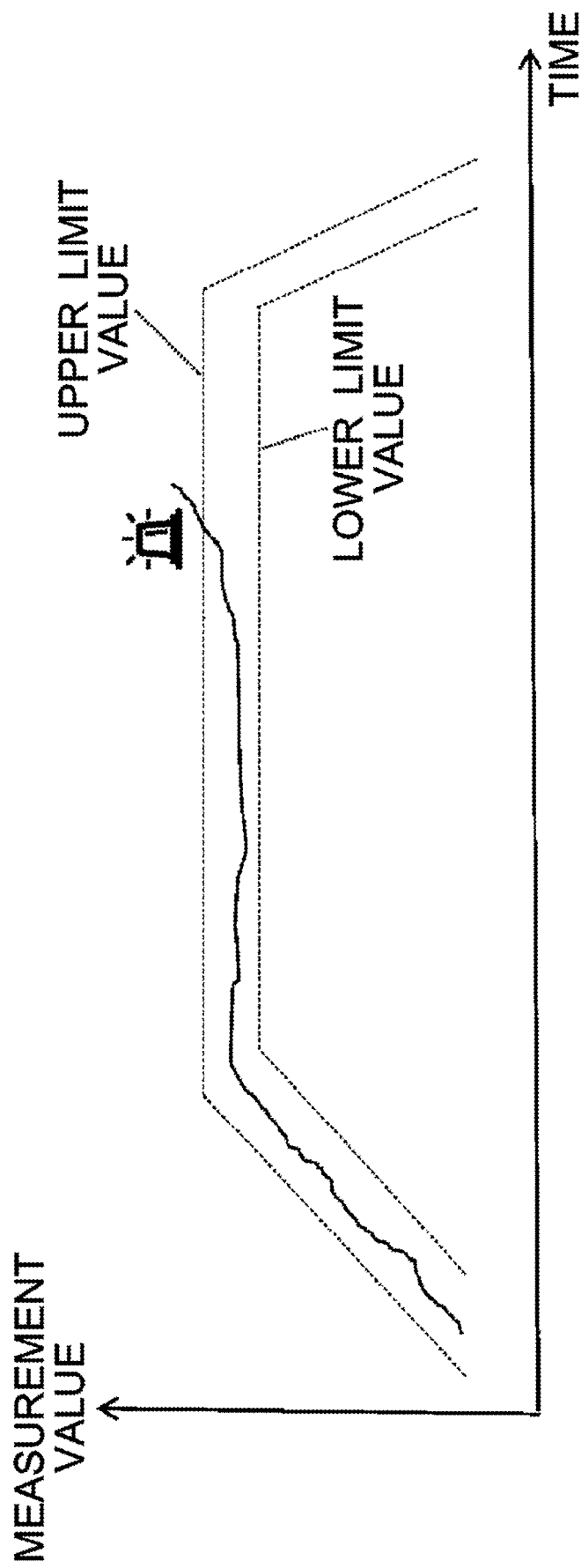
FIG. 9 illustrates an alarm profile.

FIG. 9 illustrates an alarm profile. In the drawing, the horizontal axis represents the elapsed time in the batch processing, and the vertical axis represents the measurement value. The alarm profile indicated by the determination model 431B may have an upper limit value and a lower limit value of the measurement data for each elapsed time in the batch processing. Note that, in the drawing, it is determined that the state of the facility 2 is defective according to the fact that the measurement value exceeds the upper limit value.

4. Modification

Note that, in the first and third embodiments described above, it has been described that the generation apparatuses 5 and 5B generate either the determination model 431 or the determination model 431B, but both may be generated. In this case, the measurement data recording apparatuses 4 and 4B may perform determination of the state of the facility 2 using both determination models 431 and 431B.

In addition, in the first to third embodiments described above, it has been described that the target is the facility 2, but another object may be used. For example, the target may be a product manufactured in the facility 2, may be a natural object such as a living body, may be a natural environment such as weather or terrain, or may be a natural phenomenon such as a chemical reaction or a biochemical reaction.

In addition, various embodiments of the present invention may also be described with reference to flowcharts and block diagrams, where the blocks may represent (1) a stage of a process in which an operation is performed or (2) a section of an apparatus that has a role of performing the operation. Certain stages and section may be implemented by dedicated circuitry, programmable circuitry provided with computer-readable instructions stored on a computer-readable medium, and/or a processor provided with computer-readable instructions stored on a computer-readable medium. Dedicated circuitry may include digital and/or analog hardware circuitry and may include integrated circuitry (IC) and/or discrete circuitry. Programmable circuitry may include reconfigurable hardware circuitry including logic AND, logic OR, logic XOR, logic NAND, logic NOR, other logic operations, and memory elements such as flip-flops, registers, field programmable gate arrays (FPGA), programmable logic arrays (PLA), and the like.

The computer-readable medium may include any tangible device capable of storing instructions for execution by a suitable device, so that the computer-readable medium having the instructions stored therein will have a product including instructions that can be executed to create means for performing the operations specified in flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include either source code or object code written in any combination of one or more programming languages, including assembler instructions, instruction-set-architecture (ISA) instructions, machine instructions, machine-dependent instructions, microcode, firmware instructions, state-setting data, or an object oriented programming language such as Smalltalk (registered trademark), JAVA (registered trademark), C++, or the like, and conventional procedural programming languages, such as the "C" programming language or similar programming languages.

The computer-readable instructions may be provided to a general-purpose computer, a special-purpose computer, or a processor or a programmable circuit of other programmable data processing apparatus locally or via a local area network (LAN) or a wide area network (WAN) such as the Internet, and execute the computer-readable instructions to create means for executing the operations designated in the flowcharts or block diagrams. Examples of the processor include a computer processor, a processing unit, a microprocessor, a digital signal processor, a controller, a microcontroller, and the like.

Figure 10:
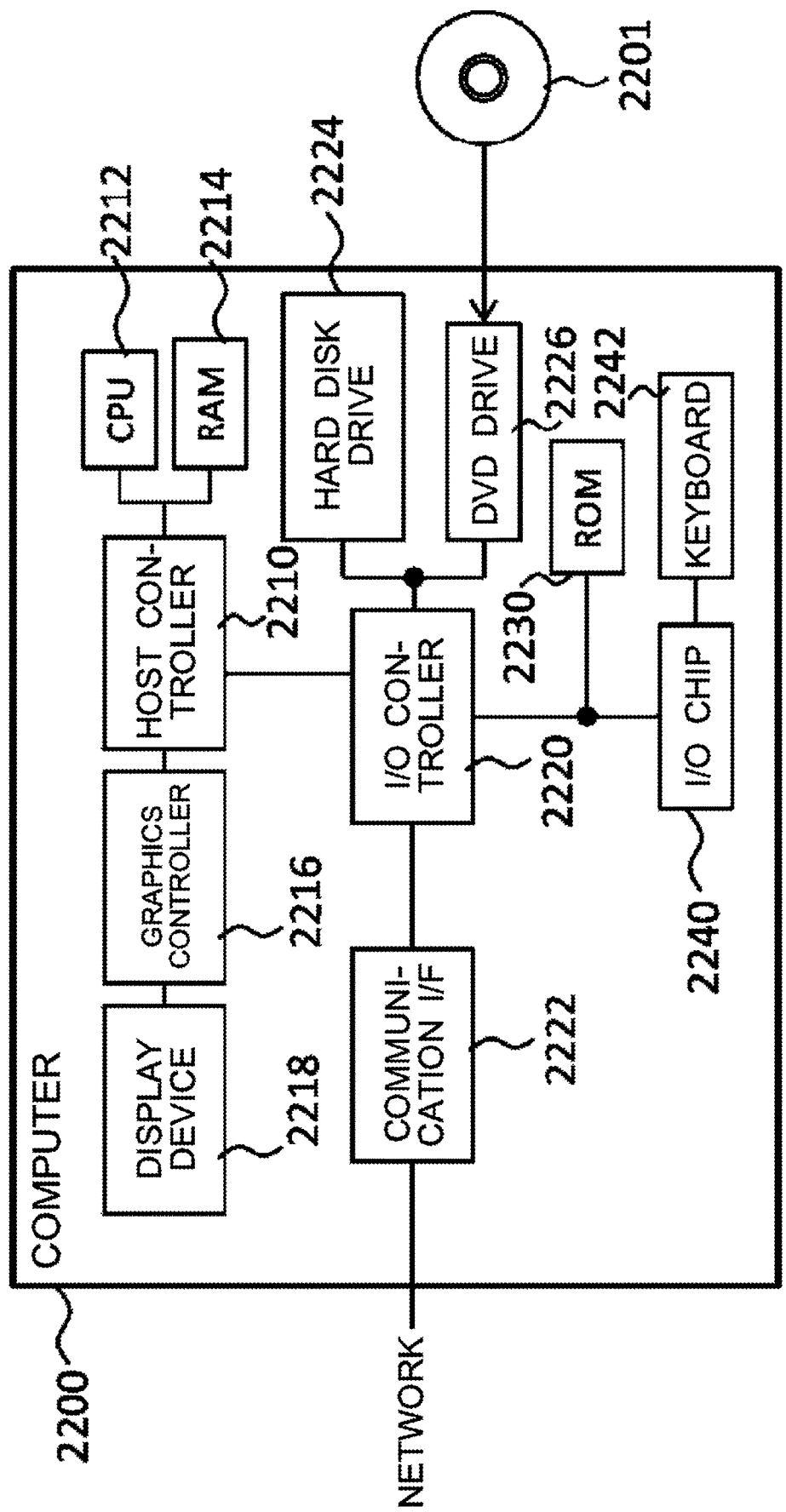
FIG. 10 illustrates an example of a computer 2200 in which a plurality of aspects of the present invention may be embodied in whole or in part.

FIG. 10 illustrates an example of a computer 2200 in which a plurality of aspects of the present invention may be embodied in whole or in part. A program installed in the computer 2200 may cause the computer 2200 to function as an operation associated with the apparatus according to the embodiments of the present invention or as one or more sections of the apparatus, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 further includes input/output units such as a communication interface 2222, a hard disk drive 2224, a DVD-ROM drive 2226, and an IC card drive, which are connected to the host controller 2210 via an input/output controller 2220. The computer further includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads programs or data from the DVD-ROM 2201 and provides the programs or data to the hard disk drive 2224 via the RAM 2214. The IC card drive reads programs and data from and/or writes programs and data to the IC card.

The ROM 2230 stores therein a boot program executed by the computer 2200 at the time of activation and/or a program dependent on hardware of the computer 2200. The input/output chip 2240 may further connect various input/output units to the input/output controller 2220 via a parallel port, a serial port, a keyboard port, a mouse port, or the like.

A program is provided by a computer-readable medium such as the DVD-ROM 2201 or the IC card. The program is read from the computer-readable medium, installed in the hard disk drive 2224, the RAM 2214, or the ROM 2230, which are also an example of the computer-readable storage medium, and executed by the CPU 2212. The information processing described in these programs is read by the computer 2200 and provides cooperation between the programs and various types of hardware resources. The apparatus or method may be configured by implementing operation or processing of information according to the use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause all or a necessary portion of a file or a database stored in an external recording medium such as the hard disk drive 2224, the DVD-ROM drive 2226 (DVD-ROM 2201), or the IC card to be read by the RAM 2214, and may execute various types of processing on data on the RAM 2214. Next, the CPU 2212 writes back the processed data to the external recording medium.

Various types of information such as various types of programs, data, tables, and databases may be stored in a recording medium and subjected to information processing. The CPU 2212 may execute various types of processing on the data read from the RAM 2214, including various types of operations, information processing, conditional determination, conditional branching, unconditional branching, information retrieval/replacement, and the like, which are described throughout the present disclosure and specified by a command sequence of a program, and writes back the results to the RAM 2214. In addition, the CPU 2212 may retrieve information in a file, a database, or the like in the recording medium. For example, in a case where a plurality of entries each having the attribute value of a first attribute associated with the attribute value of a second attribute is stored in the recording medium, the CPU 2212 may retrieve an entry matching the condition in which the attribute value of the first attribute is specified from among the plurality of entries, read the attribute value of the second attribute stored in the entry, and thereby acquire the attribute value of the second attribute associated with the first attribute satisfying the predetermined condition.

The programs or software modules described above may be stored in a computer-readable medium on or near the computer 2200. In addition, a recording medium such as a hard disk or a RAM provided in a server system connected to a dedicated communication network or the Internet can be used as a computer-readable medium, thereby providing a program to the computer 2200 via the network.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: system
2: facility
4: measurement data recording apparatus
5: generation apparatus
20: sensor
21: equipment
40: acquisition portion
41: measurement data recording portion
43: storage portion
45: communication portion
46: DTW processing portion
48: determination portion
51: communication portion
52: storage portion
53: generation portion
58A: classification portion
430: batch file
431: determination model
451: measurement data transmission portion
452: model reception portion
453: decoding portion
510: acquisition portion
511: conversion portion
512: encryption portion
513: transmission portion
531: DTW processing portion
532: learning processing portion
533B: statistical processing portion
581: analysis portion
582: setting portion
583: specification portion
2200: computer
2201: DVD-ROM
2210: host controller
2212: CPU
2214: RAM
2216: graphics controller
2218: display device
2220: input/output controller
2222: communication interface
2224: hard disk drive
2226: DVD-ROM drive
2230: ROM
2240: input/output chip
2242: keyboard

What is claimed is:

1. A measurement data recording apparatus comprising:
   an acquisition portion configured to acquire time-series measurement data obtained by measuring a state of a target;
   a recording portion configured to record the acquired measurement data;
   a measurement data transmission portion configured to transmit the measurement data recorded in the recording portion to a generation apparatus configured to generate a determination model for determining a quality of the state of the target;
   a model reception portion configured to receive the determination model generated by the generation apparatus; and
   a determination portion configured to determine the quality of the state of the target from newly acquired measurement data using the received determination model.

2. The measurement data recording apparatus according to claim 1, comprising:
   a decoding portion configured to decode the determination model that is encrypted and received by the model reception portion.

3. The measurement data recording apparatus according to claim 1, wherein
the model reception portion makes the determination model available from the determination portion in response to reception of information indicating validity of the determination model together with the determination model.

4. The measurement data recording apparatus according to claim 2, wherein
the model reception portion makes the determination model available from the determination portion in response to reception of information indicating validity of the determination model together with the determination model.

5. The measurement data recording apparatus according to claim 1, wherein
the determination portion uses the determination model to determine, from newly acquired time-series measurement data, the quality of the state of the target when the time-series measurement data is measured.

6. The measurement data recording apparatus according to claim 2, wherein
the determination portion uses the determination model to determine, from newly acquired time-series measurement data, the quality of the state of the target when the time-series measurement data is measured.

7. The measurement data recording apparatus according to claim 3, wherein
the determination portion uses the determination model to determine, from newly acquired time-series measurement data, the quality of the state of the target when the time-series measurement data is measured.

8. The measurement data recording apparatus according to claim 1, wherein
the determination portion performs determination using a difference between a determination threshold value in the determination model and an index value indicating the state of the target acquired from the determination model in response to input of a value corresponding to a measurement value of the measurement data, and outputs a determination result and at least the latest difference.

9. The measurement data recording apparatus according to claim 2, wherein
the determination portion performs determination using a difference between a determination threshold value in the determination model and an index value indicating the state of the target acquired from the determination model in response to input of a value corresponding to a measurement value of the measurement data, and outputs a determination result and at least the latest difference.

10. The measurement data recording apparatus according to claim 3, wherein
the determination portion performs determination using a difference between a determination threshold value in the determination model and an index value indicating the state of the target acquired from the determination model in response to input of a value corresponding to a measurement value of the measurement data, and outputs a determination result and at least the latest difference.

11. The measurement data recording apparatus according to claim 5, wherein
the determination portion performs determination using a difference between a determination threshold value in the determination model and an index value indicating the state of the target acquired from the determination model in response to input of a value corresponding to a measurement value of the measurement data, and outputs a determination result and at least the latest difference.

12. The measurement data recording apparatus according to claim 1, wherein
the determination portion uses the determination model to determine, each time measurement data is newly acquired, the quality of the state of the target when the measurement data is measured.

13. The measurement data recording apparatus according to claim 2, wherein
the determination portion uses the determination model to determine, each time measurement data is newly acquired, the quality of the state of the target when the measurement data is measured.

14. The measurement data recording apparatus according to claim 3, wherein
the determination portion uses the determination model to determine, each time measurement data is newly acquired, the quality of the state of the target when the measurement data is measured.

15. A method comprising:
acquiring time-series measurement data obtained by measuring a state of a target;
recording the acquired measurement data;
transmitting the measurement data recorded in the recording to a generation apparatus configured to generate a determination model for determining a quality of the state of the target;
receiving the determination model generated by the generation apparatus; and
determining the quality of the state of the target from newly acquired measurement data using the received determination model.

16. A non-transitory computer readable medium with a program that is recorded therein and causes a computer to function as:
an acquisition portion configured to acquire time-series measurement data obtained by measuring a state of a target;
a recording portion configured to record the acquired measurement data;
a measurement data transmission portion configured to transmit the measurement data recorded in the recording portion to a generation apparatus configured to generate a determination model for determining a quality of the state of the target;
a model reception portion configured to receive the determination model generated by the generation apparatus; and
a determination portion configured to determine the quality of the state of the target from newly acquired measurement data using the received determination model.

* * * * *